United States Patent
Foster (10) Patent No.: US 6,675,382 B1
(45) Date of Patent: Jan. 6, 2004

(54) SOFTWARE PACKAGING AND DISTRIBUTION SYSTEM

(75) Inventor: Gary D. Foster, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/332,767

(22) Filed: Jun. 14, 1999

(51) Int. Cl.[7] .......................... G06F 9/445; G06F 9/44; G06F 17/30
(52) U.S. Cl. .................. 717/177; 717/169; 717/170; 717/172; 717/175; 707/1; 707/10
(58) Field of Search .................. 717/11, 168, 169, 717/171–178; 709/200, 201, 217, 218, 220, 221, 223, 247; 707/1, 10; 705/27, 51; 710/5; 380/201, 202, 203, 229

(56) References Cited

U.S. PATENT DOCUMENTS

| 5,768,597 A | 6/1998 | Simm |
| 5,835,777 A | 11/1998 | Staelin |

(List continued on next page.)

FOREIGN PATENT DOCUMENTS

| EP | 0 703 531 | 3/1996 |
| EP | 0 802 480 | 10/1997 |
| WO | WO 98/45768 | 10/1998 |

OTHER PUBLICATIONS

Table–Driven Selective Software Download, IBM Technical Disclosure Bulletin, Feb. 1, 1990, pp. 40–41, vol. 32, No. 9B, IBM Corp., New York, USA.
ar File Format (Small), {http://www.rs6000.ibm.com/doc_link/en_US/a_doc_lib/files/aixfiles/ar_small.htm} (Dec. 21, 1998).
cpio(C), {http://rabbit.oct.co.za:457/cgi–bin/man/man?cpio+} (Dec. 21, 1998).
Eric Goebelbecker, cpio: A Multipurpose Archive Tool, {http://www.linuxjournal.com/issue23/cpio.html} (Dec. 21, 1998).
Comparison of tar and cpio, {http://sunland.gsfc.nasa.gov/info/tar/cpio.html} (Dec. 21, 1998).
Peter's PGP page, {http://www.gildea.com/pgp/} (Dec. 21, 1998).
Understanding the Manifest, {http://splash.javasoft.com/docs/books/tutorial/jar/basics/manifest.html} (Dec. 23, 1998).

Primary Examiner—Hoang-Vu Antony Nguyen-Ba
(74) Attorney, Agent, or Firm—Gunnison, McKay & Hodgson, L.L.P.; Philip J. McKay (57) ABSTRACT

A method and apparatus for packaging and distributing software. Embodiments of the invention comprise a software packaging system that is portable across many platforms. Each package is self-contained in form of a single-file entity that comprises a payload file and a control file. The payload file is an archive file that contains a compressed collection of all the software files that are required for installation of the software package. The control file includes the necessary information for installation of the files contained in the payload file, in addition to other descriptive information used to determine the size, type, location of storage, and other useful attributes of a software package, even before it is installed on a system. Security measures have been implemented in the system to detect a package the contents of which have been tampered with. Embodiments of the invention can be utilized to install packaged software that is accessible via the Internet. A package on a remote source can be accessed and installed using a Uniform Resource Locator (URL) that indicates the package's specific address on the remote source. Embodiments of the invention are designed such that the entire system is small in size so that the storage space and the transmission bandwidth required for their storage or transportation are minimized. Embodiments of the invention may be used to install, remove or update a software package.

5 Claims, 5 Drawing Sheets

U.S. PATENT DOCUMENTS

| | | | | |
|---|---|---|---|---|
| 5,860,012 A | | 1/1999 | Luu | |
| 5,894,516 A | * | 4/1999 | Brandenburg | 705/51 |
| 5,923,885 A | * | 7/1999 | Johnson et al. | 717/176 |
| 6,029,142 A | * | 2/2000 | Hill | 705/27 |
| 6,038,399 A | * | 3/2000 | Fisher et al. | 717/178 |
| 6,067,582 A | * | 5/2000 | Smith et al. | 710/5 |
| 6,138,153 A | * | 10/2000 | Collins, III et al. | 709/221 |
| 6,192,518 B1 | * | 2/2001 | Neal | 717/175 |
| 6,256,668 B1 | * | 7/2001 | Slivka et al. | 709/220 |
| 6,324,691 B1 | * | 11/2001 | Gazdik | 717/178 |

\* cited by examiner

SOFTWARE PACKAGING AND DISTRIBUTION SYSTEM

BACKGROUND OF THE INVENTION

A. Field of Invention

This invention relates to the field of computer software, and more specifically, software packaging and distribution. Portions of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris, "Write Once, Run Anywhere", Java, JavaOS, JavaStation and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

B. Background Art

Software developers, vendors and manufacturers prepare and distribute software in packages, using a packaging system. A software package is comprised of multiple files. A packaging system is a tool that is used to bundle these multiple files together so that the software can be easily distributed as a single package. Each package, typically, includes the software files that are required for installation of the software and a mechanism that is implemented so that a user can install the software on a computer or later remove (or uninstall) the software.

Most current packaging systems are complicated, inefficient and difficult to use. For example, they are non-intuitive such that a user has to read a manual or follow numerous procedures in order to build or install a software package. Further, current systems are not web-enabled and do not allow for installation or configuration of software packages from a remote location, via the Internet. A method is needed to provide an efficient and simple solution for packaging, distributing and installing software.

Most current packaging systems provide a method for installing software and for removing some of the components of the installed software from a computer system using an uninstall feature. However, current systems do not provide sufficient descriptive information about the content, type, location, and/or the time that the software was installed nor any means to easily track any of this information.

It would be useful if the above information were retrievable during or prior to installation or removal of software packages for a user's review. It would also be useful if this information were accessible from one specific compact source so that the storage space and the transmission bandwidth required for data storage and delivery are minimized.

Most prior art packaging systems available fail to provide a packaging system that can install or setup software from a remote location through various communication systems, such as the Internet, that identifies if package contents are intact or if they have been tampered with, or that is portable across different platforms (i.e., operating systems and hardware architectures). For example, most of the current packaging systems are vendor and system specific and do not support cross-platform portability. Prior art packages can execute only on selected platforms.

Prior art packaging systems are complex. As a result, building or installing software packages using the prior art packaging systems results in high overhead costs. The problems of the current software packaging systems can be better understood from a discussion of the Internet and a description of software packaging systems currently available.

Vendor-supplied Software Packaging Systems

Some current packaging systems are developed by software manufacturers or distributors. These systems are used at the manufacturing or development sites to create a software package for shipment to end users, or are used to install or otherwise configure.

Sun Microsystems corporation has developed a vendor-specific packaging system entitled "pkgadd system." This system enforces dependencies among software components. This means that the system detects the relationships between different components of a software package (e.g., software files that refer to or need to access the content of other files) and ensures that installation or removal of all dependent components takes place properly. Solaris' packaging system can be used to build a software package and/or to install and remove system software.

A disadvantage of the "pkgadd system" is that package creation and/or installation procedures, while documented, are tedious and complex. A user, for example, must follow multiple procedures and enter a number of commands to create or install a package. Furthermore, the system implements its own packaging format (i.e., an unbundled directory structure) that is different (and difficult to understand) than the standard file format typically used for saving information. Therefore, using the system is non-intuitive and difficult for most non-technical or even technical users.

Another disadvantage of the pkgadd system is that it is non-portable across different platforms. The Solaris platform is the only platform that pkgadd system can execute on. Thus, the system is inoperable on other more commonly used platforms in the market today. Another disadvantage with the pkgadd system is that it does not allow for installation or distribution of software packages via the Internet.

Freeware Systems

In addition to vendor-supplied software packaging systems, freeware systems are also available that provide software packaging options. Freeware systems are generally developed and distributed by software manufacturers and are freely available to public for use.

"RPM(2)," created by RedHat Software Corporation is one of the more popular freeware packaging systems currently available. It enforces strong dependencies, installs and removes system software, and can be used to build a complete operation system. It is also portable over a number of different platforms.

A disadvantage of the RPM system is that package creation is non-intuitive and complex. For example, a 400 page user manual accompanies the system, explaining its features and how it can be used. Further, RPM does not adapt well with other computing systems that may be used to develop a software package and does not provide an adequate solution when used in parallel with other computer system utilities. RPM imposes a significant amount of overhead on system resources before it can begin to be used effectively.

The Internet

The Internet is a client/server system that includes a worldwide network of interconnected computers. A "client"

is the computer that is used to access the Internet. An Internet client accesses a computer on the network ("server") via an Internet provider. An Internet provider is an organization that provides a client with access to the Internet (via analog telephone line or Integrated Services Digital Network line, for example). Typically, when a user logs onto the Internet or the World Wide Web (WWW), using a client computer, the user views "web pages" that are stored on a remote server. Information including data files, and the web pages are often shared and transferred between the client and the server.

A client may, for example, access resources on another computer (i.e., a remote server) to install or retrieve a software from that computer, using the Internet. To access a resource on a remote server an addressing scheme is used that defines the route (or path) to that resource. For example, a home page on the WWW can be accessed via its Uniform Resource Locator (URL).

URLs define the method used, the name of the remote server (domain name), and other information necessary for accessing a resource, such as the path or directories where the resource is located. One method of retrieval may be more efficient than another method depending on the type of resources accessed and the manner the information are transferred from the server to the client.

The components of the Internet include browser software, network links, and servers. The browser software, or browser, is a user-friendly interface that simplifies access to the Internet. A browser allows a client to communicate a request without having to learn a complicated command syntax, for example. A browser typically provides a graphical user interface (GUI) for displaying information and receiving input. Examples of browsers currently available include Netscape Navigator and Internet Explorer.

A browser displays information to a client or user as pages or documents. A language called Hypertext Markup Language (HTML) is used to define the format for a page to be displayed in the browser. A Web page is transmitted to a client as an HTML document. The browser executing at the client parses the document and produces and displays a Web Page based on the information in the HTML document. Consequently, the HTML document defines the Web Page that is rendered at runtime on the browser.

SUMMARY OF THE INVENTION

A method and apparatus for efficient packaging and distribution of software is described. Embodiments of the invention comprise a software packaging system that is portable and easy to use and understand. It works for constructing software packages and distributing them to end-users.

Using one or more embodiments of the invention, a software package may be installed from an indirect source referenced by a Uniform Resource Locator. Each package is self-contained in the form of a single-file entity that comprises a payload file and a control file. The payload file is an archive file that contains a compressed collection of all the software files that are required for installation of the software package. The control file can be a text file, for example, and includes the necessary information for decompression and installation of the files contained in the payload file, in addition to other descriptive information pertaining to the package.

The above information is used to determine the size, type, location of storage, and other useful attributes of a software package, even before it is installed on a system. This gives a user the advantage of deciding in advance whether or not to install the software. This feature is specifically helpful where the retrieval of the package itself can take a long time, for example, in instances where a sizable package is downloaded from a remote source via telecommunication lines.

Security measures have been implemented in the system to detect a package that has been tampered with. Embodiments of the invention are implemented to be portable across platforms allowing the system to operate on different computer systems without substantial modification.

Additionally, embodiments of the invention are web-enabled. Thus, it can be utilized to install packaged software that is accessible via the Internet. A package on a remote source can be accessed and installed using a Uniform Resource Locator (URL) that indicates the package's specific address on the remote source as if the package was locally available to the system.

One or more embodiments of the invention are designed such that the storage space and the transmission bandwidth required for its storage or transport can be maintained at a minimum. Embodiments of the invention may be used to install, remove or upgrade a software package. The invention can also be used to catalogue and describe prior installed software, uninstalled software packages, and can verify the integrity of a package prior to installation.

DETAILED DESCRIPTION OF THE INVENTION

The invention provides a method and apparatus for the efficient packaging and distribution of software. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Embodiment of Computer Execution Environment (Hardware)

Figure 1:
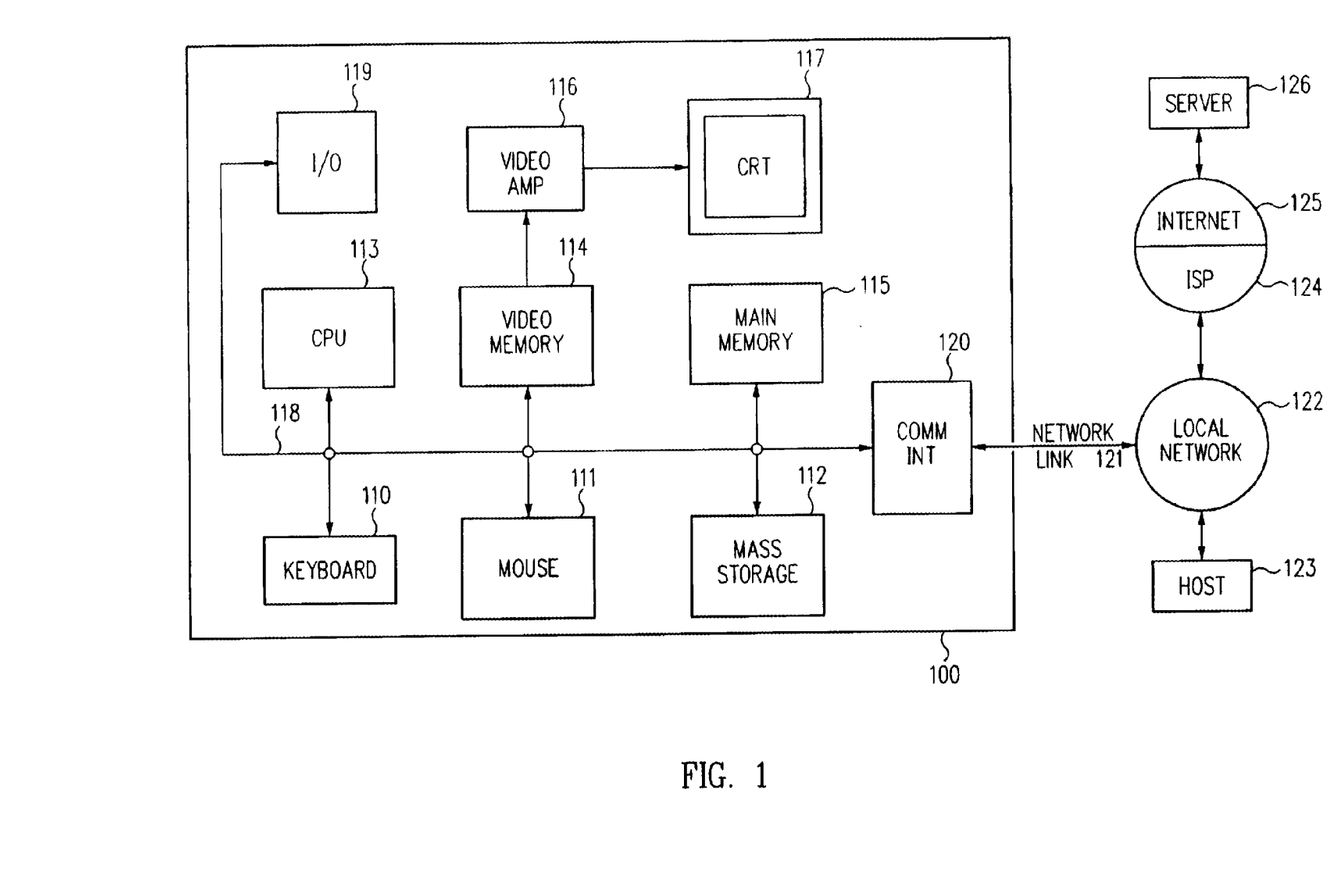
FIG. 1 is an illustration of a general purpose computer, according to one or more embodiments of the invention.

An embodiment of the invention can be implemented as computer software in the form of computer readable code executed on a general purpose computer such as computer 100 illustrated in FIG. 1, or in the form of bytecode class files executable within a Java runtime environment running on such a computer, or in the form of bytecodes running on a processor (or devices enabled to process bytecodes) existing in a distributed environment (e.g., one or more processors on a network). A keyboard 110 and mouse 111 are coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, all coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC microprocessor, or a microprocessor manufactured by Motorola, such as the 680X0 processor, or a microprocessor manufactured by Intel, such as the 80X86, or Pentium processor.

However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125.

Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

PACKAGE STRUCTURE

Figure 2:
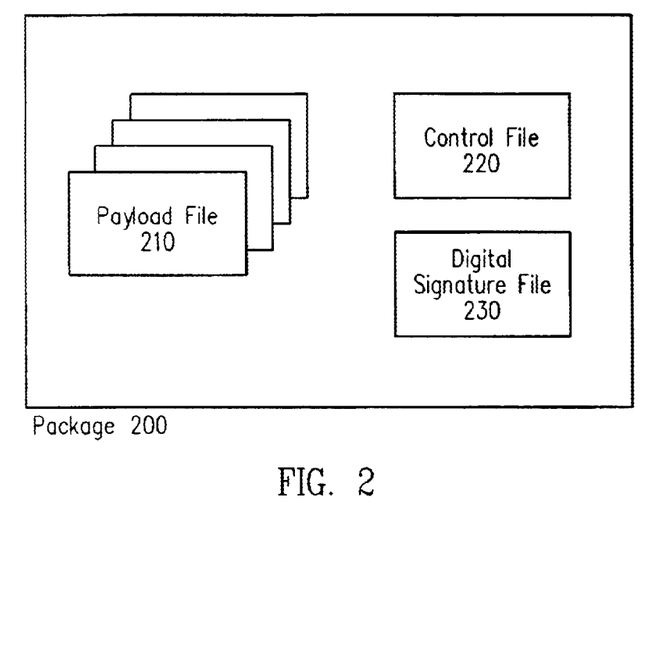
FIG. 2 illustrates a block diagram of the different components of a software package, according to one or more embodiments of the invention.

The invention has been designed with simplicity in mind, so that the system is portable across many platforms, is compact in size, and uses minimal system resources to operate. FIG. 2 illustrates a block diagram of the different components of a software package that can be created according to one or more embodiments of the invention. Each package is a single-file entity, such as package 200, that has been specially formatted to comprise multiple files.

A single-file entity refers to a package that includes several files combined into one. A single-file structure allows for easy distribution and management of multiple files as one file. In embodiments of the invention, package 200 is created by compressing and storing required software files into a single file. An archive format can be used to create package 200.

Archive files are generally used for long term storage of files and are compressed for optimal storage. Thus, an archive format is suitable for packaging of multiple files into one compact entity. For example, in one or more embodiments of the invention, package 200 may be a simple "ar" (archive) file. An ar file can be created by using an ar archive command. An ar file contains a collection of several files preserving the directory structure within which the files are saved and the relationship among those files and directories.

Due to the simplicity of the "ar" file format, package 200 can be created with little instruction. In one or more embodiments of the invention, package 200 is comprised of a payload file 210 that includes the software files, and a control file 220 that contains control information pertaining to those files and their dependencies. The single-file structure of package 200 allows for a software package to be bundled neatly into one file and easily transmitted for distribution.

Payload File

Payload file 210 contains all files that are required for the installation of computer software. Computer software is composed of numerous files that are related to one another. These files can be divided into various groups, also referred to as folders or directories. A folder or a directory can have many sub-folders, or sub-directories. Thus, groups of files can be stored in a treelike structure commonly referred to as a directory structure.

In one or more embodiments of the invention, payload file 210 is compressed using a compression algorithm so that less storage space and transmission bandwidth is required for storing and transporting package 200. At the time of installation all compressed files are decompressed and saved into proper directories so they can be appropriately accessed at the time of execution of the software.

It is important that the directory structure and the relationship between the files are preserved during compression so that they can be properly restored and accessed at the time of decompression, installation, or execution of the software. Some compression algorithms provide a better degree of compression. For example, embodiments of the invention utilize the "gzip" compression algorithm because "gzip" offers significant space savings over standard compression formats.

Embodiments of the invention also utilize a multipurpose archive tool called "cpio" to create payload file 210. This tool can create and extract archives on diskettes, tapes or in files using many different archive formats. It can also create an almost perfect duplicate of a directory tree, preserving file ownership modes, and access times.

Control File

Control file 220 includes "control information" that describes the contents of payload file 210, operations that may be performed on them, and other information regarding the history of creation or installation of those files. In one or more embodiments of the invention, control file 220 is a plain text file. It comprises entries in the form of FIELD= 'value' separated by new lines as delimiters. Comment lines and white space may be used to annotate each field. Any entry that is blank can be left out entirely, or left in as a blank entry (e.g., FIELD=' ') at the discretion of the package creator.

Each entry provides information describing the software being installed, removed, or updated including information such as operations to be performed before and after each process, the type and nature of the files included in payload file 210, and other useful information needed to track the dependencies between the files included therein.

For example, a list of field entries may include:

```
         NAME = 'modelname'
      VERSION = 'version string'
  DESCRIPTION = 'Description of model'
 DEPENDENCIES = '<dependency>/<dependency>/...'
    OSVERSIONS = 'uname -r output'
   MAINTAINER = 'Name or address of maintainer'
     PLATFORM = 'uname -p output'
  POSTINSTALL = "Name of postinstall script to run"
    PREREMOVE = "Name of a preremove script to run"
```

In one or more embodiments of the invention, the above entries are parsed to extract the available information pertaining to the software files being installed. The information extracted can be utilized to install, remove, or upgrade software components. Various field values will trigger various actions, if that action is supported.

Embodiments of the invention are designed so that they can execute on different platforms. Depending on the platform some actions and therefore some fields may or may not be supported. If a field is not supported, then no value is assigned to it. Thus, when that field is parsed, nothing happens as there is no value to indicate what action is to be taken. This allows easy integration of new fields as the need arises.

For example, the NAME field is used to provide a unique identifier for each package instantiated by the system. This value is used to reference a package during system queries, package installation, removal, upgrade and in dependency constraint enforcement.

The VERSION field provides a means of tracking the release version of a package. In embodiments of the invention, mechanisms may be constructed to use the value associated with the version field to determine if upgrades are needed.

The DEPENDENCIES field identifies other packages or files that are dependent on the package or the content of the package that is being operated on. For example, it identifies software files or packages that are required to be available on a computer system in order for another software package to properly operate. Multiple dependencies are possible as one package or file may be dependent on multiple files or packages.

The MAINTAINER field identifies the name address and other contact information for the person responsible for maintaining or creating the software package.

The OSVERSION and PLATFORM fields specify the operating system version and the system platforms over which the embodiments of invention can be executed. If a package is architecturally neutral (i.e., can run on any platform), the value for these fields may be left blank.

POSTINSTALL field provides a reference to scripts or shell commands that will be executed after the installation of the software package is completed. Scripts and shell commands are operation line commands that can request from the operating system to perform certain functions, such as creating or deleting files, changing file names, or other pertinent requests. These scripts or shell commands can contain multiple actions separated by predefined delimiters (e.g., JDH-insert symbols). In embodiments of the invention, postinstall scripts are often part of payload 210. In other embodiments they can be arbitrary system commands.

The "PREREMOVE" field defines actions that are to be performed prior to removing a package from the system. These actions can be defined by scripts and shell commands referenced by the field's value, and for example can include a request for removing any dependent files or directories from the system.

OPERATION

Embodiments of the invention are command-line driven. For example, a user can invoke different modes of operation via command-line switches, with option switches being used to modify the behavior as desired or appropriate. There are several modes of operation. These modes include commands to install, remove or upgrade software contained in a single software package. The single-file entity structure of the package allows for simple and efficient transport, storage, and/or removal of all required software files in a single package, rather than multiple packages.

Figure 3:
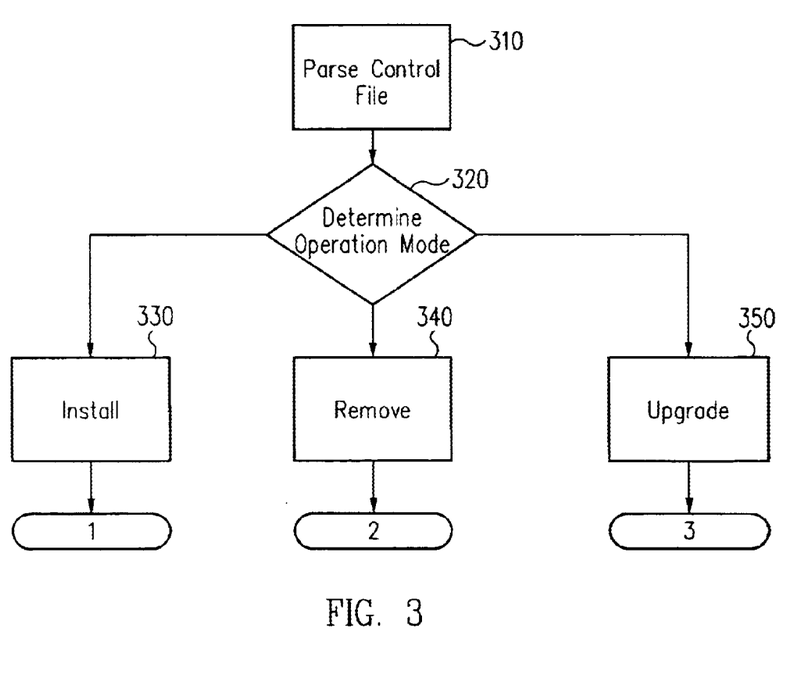
FIG. 3 is a flow diagram illustrating different modes of operation supported by one or more embodiments of the invention.

FIG. 3 is a flow diagram illustrating different modes of operation available according to one or more embodiments of the invention. In order to perform an operation on package 200, control file 220 is parsed at step 310. At this step, the computer system that performs the required operations reads the content of control file 220 and determines the value assigned to the fields included therein.

In one or more embodiments of the invention, at step 310 the name and location of the files in payload file 210, any dependencies between those files, and other pre or postinstall actions that may be required are determined. At step 320, depending on the command specified, an operation mode is selected and the computer system proceeds to install, remove or upgrade a software package at steps 330, 340, or 350.

Installation

Figure 4:
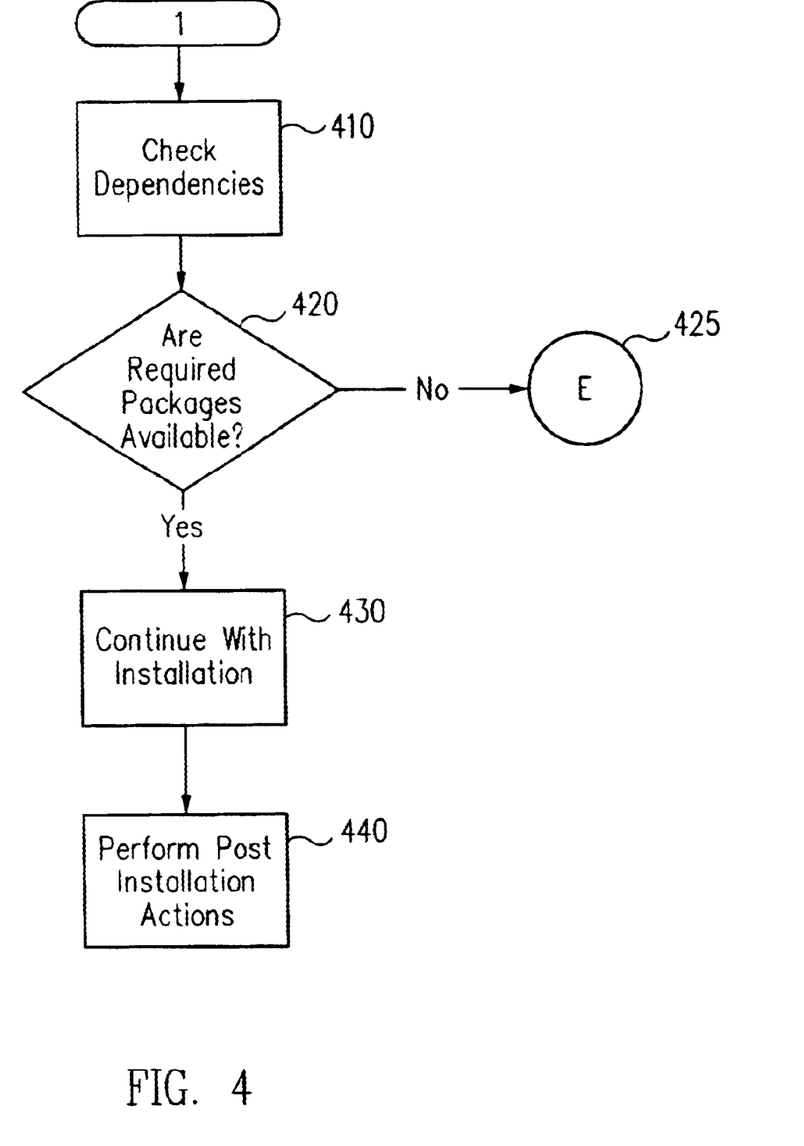
FIG. 4 is a flow diagram illustrating the method of installing a software package, according to one or more embodiments of the invention.

FIG. 4 is a flow diagram illustrating the method of installing a software package, according to one or more embodiments of the invention. Control file 220 specifies dependencies between package 200 being installed and other packages in the system.

At step 410, prior to installing package 200, any dependencies are checked as specified by the DEPENDENCIES field in control file 220. If the dependent files or packages required for the proper operation of package 200 are not present on the system, then an error is thrown at step 425. Otherwise, the installation process continues at step 430. Installation process may include decompressing the content of payload file 210, creating the appropriate directories on the system and storing proper files in proper directories according to the field values in control file 220.

At step 440, any actions defined in the "POSTINSTALL" field are executed. Postinstall actions can include creating specific files or directories for the packaged software utilities, decompressing installed files, renaming such files, etc.

In embodiments of the invention, "POSTINSTALL" field defines the post script or shell command values that are passed to the operating system or a shell process for execution. These commands can be passed in an unmodified form without inspection for any errors. Postinstall scripts are executed after successful package installation. A post install script may be utilized to query the user for registration information, for example, or other post installation matters.

Removal

Figure 5:
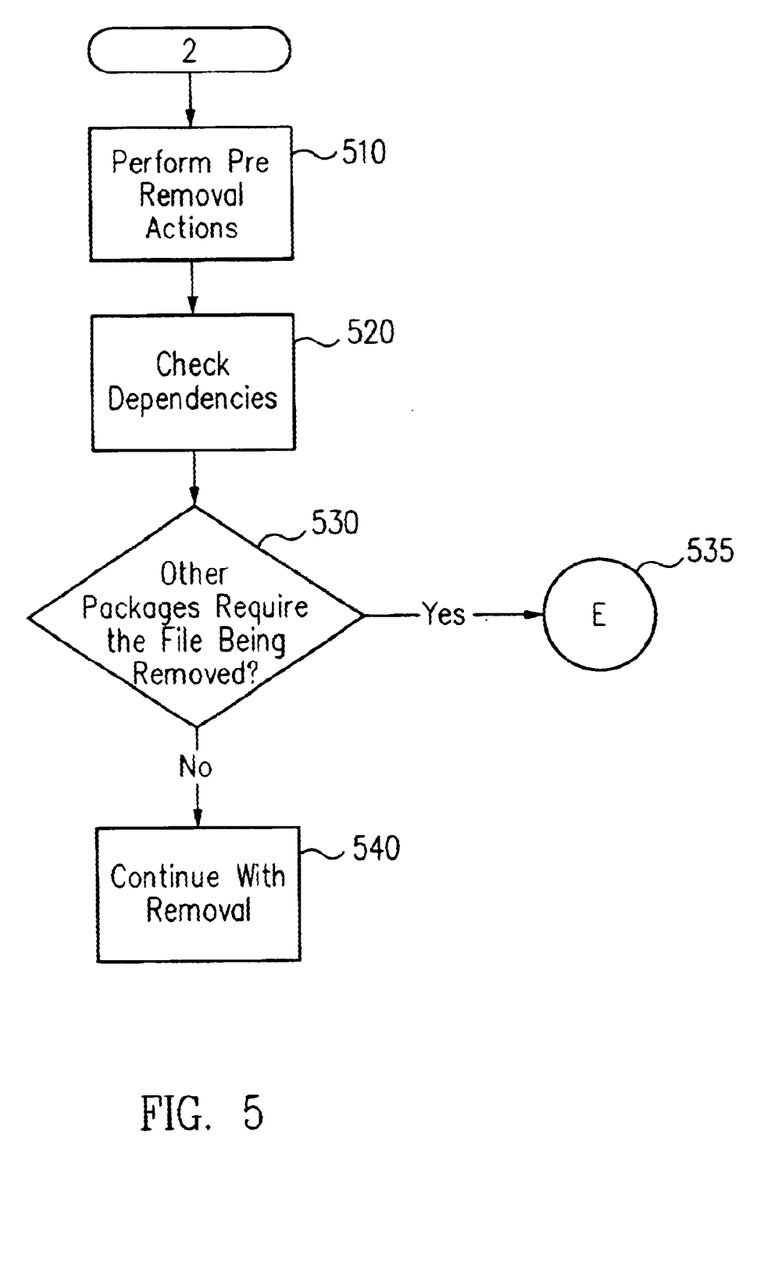
FIG. 5 is a flow diagram illustrating the method of removing a software package, according to one or more embodiments of the invention.

FIG. 5 is a flow diagram illustrating the method of removing a software package according to one or more embodiments of the invention. At step 510, actions specified by PREREMOVE field of control file 220 are carried out, if any. These actions may include creating a backup of specific files or other actions related to various housekeeping matters that need to be performed prior to removal of package 200.

Control file 220 may include information about software package 200, comprising a list of files that are to be removed and any dependencies that exists between them. At step 520 these package dependencies are analyzed as the removal of one file or package may leave a dependent package inoperable. At step 530, a determination as to whether other installed files or packages require the presence of package 200, or one of the files contained therein, is made. If other installed files or packages require the presence of package 200 or one of the files contained therein, then an error occurs at step 535 as a dependency constraint is deemed to be violated. Otherwise, at step 540 the removal process continues. The removal process may include deleting, compressing or copying a number of files and directories from the system, according to the information and the list of files contained in control file 220.

During the removal phase, other packages may be concurrently installed that require the presence of package 200 on the system. In embodiments of the invention, the system checks the dependencies between package 200 and the packages that are being simultaneously installed. If any dependencies exist then additional errors are thrown to warn the user of such violations and to prevent the user from making other software unusable inadvertently by removing package 200.

Upgrade

Figure 6:
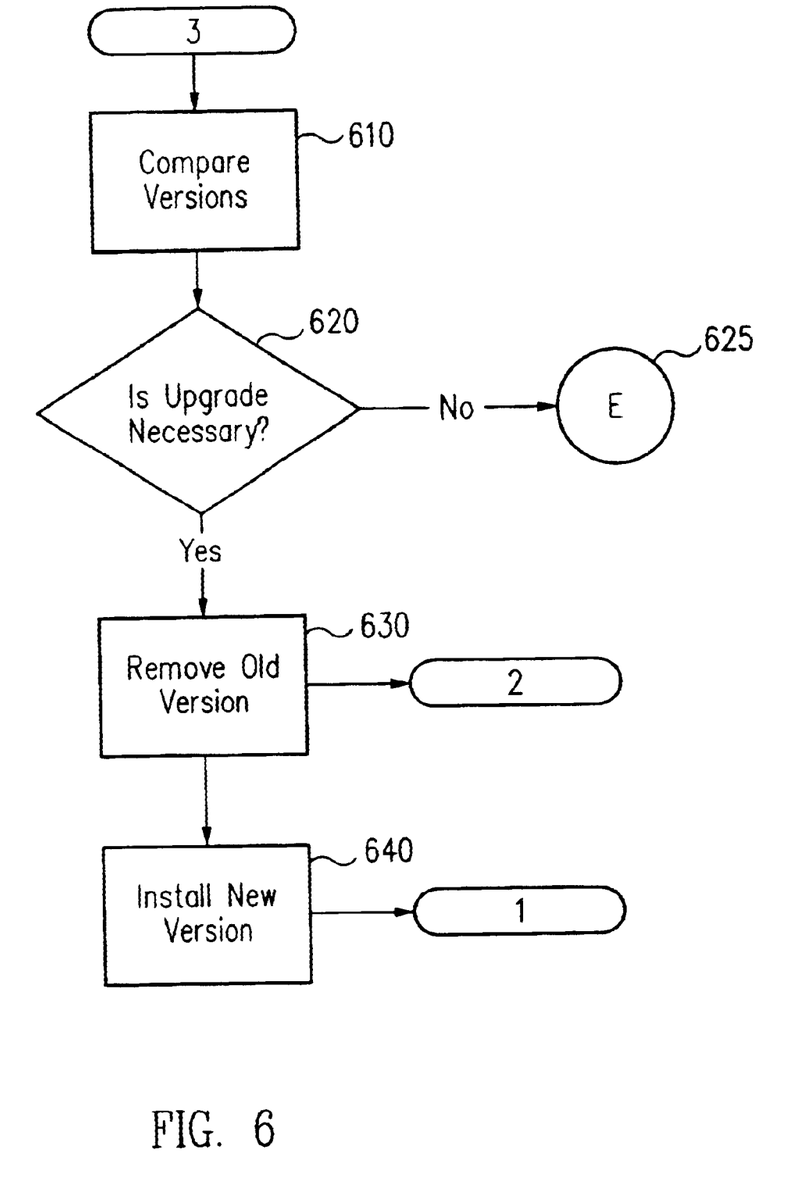
FIG. 6 is a flow diagram illustrating the upgrade process, according to one or more embodiments of the invention

One or more embodiments of the invention can be used to upgrade a previously installed package ("old package") into an upgraded package ("new package"). FIG. 6 is a flow diagram illustrating the upgrade process, according to one or more embodiments of the invention. At step 610, the VERSION value contained in the control file associated with the old package is compared with the VERSION value of the new package.

Based on this comparison, at step 620, it is determined if the old package contains an old release and if it needs to be upgraded. If so, then the old version is removed at step 630, and the new version is installed at step 640. Otherwise, at step 625 an error is thrown indicating that no upgrade is necessary.

During a package upgrade a preremove action is executed for the old package and a postinstall action is triggered for the new package. Dependency constraint checking may not be required as the new release will at least contain an upgraded version of the same collection of files as the old release, if not more. Thus, in one or more embodiments of the invention, no dependencies are checked during a package upgrade.

In occasions, it may be necessary to install, remove, or upgrade a software package despite of any dependency violations. For example, a system administrator may need to remove a faulty software from the system. As such, in embodiments of the invention, dependency constraint checking can be overridden by using a command line option. This will allow a user to force a package installation, removal, or upgrade when appropriate.

OBTAINING PACKAGE INFORMATION

Embodiments of the invention provide a user with the option to execute queries on a package to determine the contents of the package prior to installation or removal. For example, a user can query the content of package 200 prior to installation in order to determine if it is compatible for execution on the user's computer system, or if sufficient media space is available for its storage. Other types of queries may return information such as a package's name, release version, path of storage, size, dependencies, maintainer, etc. These information are useful in determining the software functionalities and requirements.

In embodiments of the invention, a query can be executed to obtain information about a package, whether or not that package is installed on the local computer system. For example, if the package is located on a remote source (i.e., an Internet web site) a user may query the package prior to installing or downloading the software package from the remote source to determine its size or release version, for example. If the software is too large or an older release, a user will save time and effort required for downloading the package.

This is extremely desirable and efficient as the download or installation time for software packages via communication lines can be a slow and tedious process. Thus, obtaining sufficient information about a software package in advance of the installation or download can be highly advantageous, especially where the size of the program code is substantially large.

Table 1 below, illustrates an example a of query output according to one or more embodiments of the invention.

TABLE 1

Sample Query Output

Summary information for zircon:

| Name | zircon |
|---|---|
| Version | 1.18.104 |
| Requires | tcl-tk |
| OS Version | generic |
| Platform | generic |
| Preremove | None |
| Postinstall | /usr/bin/touch/tmp/installed.it |
| Description | Zircon - GUI IRC client |
| Maintainer | GFoster<Gary.Foster@Corp.Sun.COM> |

In addition to information that can be retrieved from a package's control file, embodiments of the invention provide the user with further detailed information about a software package by querying its manifest file. A manifest file typically contains detailed information ("meta-information") about files that are condensed and packaged together to form a software package such as package 200.

In one or more embodiments of the invention, package 200 is automatically associated with a manifest file upon creation. A manifest file, for example, can contain a list of all files contained in payload file 210 that make up package 200, their names, the directory they are stored in, dependencies there between, and other pertinent information necessary to access and manipulate these files.

The manifest can be dynamically generated from the compressed cpio archive of an uninstalled package, for example. In embodiments of the invention, the dynamically generated manifest can be stored in a local archive file at the same time that a package is installed on a computer system. This way package information can be queried even prior to the installation of the package.

Package Security

Sometimes it is necessary to install a software package from an untrusted source (e.g., an Internet web site). A concern associated with untrusted sources is the viability and originality of the information retrieved from them. For example, a user downloading or installing a software application needs to be sure that the application provided is uninfected and not tampered with. Embodiments of the invention include security mechanisms to ensure the authenticity and safety of information obtained from an untrusted source.

One or more embodiments of the invention contain security mechanisms wherein a package software comprises a signature system. For example, referring to FIG. 2, package 200 may comprise a digital PGP signature file 230. The PGP (pretty good privacy) mechanism uses public-key encryption to protect data files from unauthorized access and tampering.

In embodiments of the invention, information contained in signature file 230 can be included in control file 220. Thus, prior to downloading or installing package 200, a user can verify the authenticity of the package by checking the appropriate values set in control file 220. Any detected tampering is reported via the security mechanism and the installation of package 200 is aborted. This query function is useful prior to downloading packages from remote sources, as it can save the time required for downloading a package if it is determined that the package has been tampered with.

Access to Packages on Remote Sources

Embodiments of the invention provide a user with the ability to install software onto a client system from a remote source. Using the Internet, for example, a user may utilize the invention to access a URL that references package 200 either through the HTTP, the FTP, or other protocols. Through a proxy service, a user may use the same set of commands for installation, removal or upgrade as if package 200 is located on a local source. A proxy service forwards a local request to a remote computer that can satisfy that request, acting as a conduit for communication between a resource and a requesting party that can not otherwise access the remote resource directly.

In one or more embodiments of the invention, package 200 is downloaded from a remote source onto the local file system of the computer where the software is to be installed. Package 200 has a single-file entity structure. Hence, payload file 210, control file 220, and all other files included in package 200 are download as one file with one command. In embodiments of the invention, all files included in package 200 are compressed so that they occupy less storage space and can be transported using minimum transmission bandwidth.

Once package 200 is downloaded then payload file 210 is decompressed into multiple software files, appropriate directory structures are created on the local file system, and the decompressed files are stored therein according to the instructions contained in control file 220. After the installation is completed, package 200 downloaded in its single-file format is removed from the local file system. In other embodiments of the invention, package 200 may not be downloaded onto the local system. Instead, the software files required for installation may be directly downloaded from the remote server onto the local client system.

Embodiments of the invention maintain a set of database files to track information pertaining to software packages that have been installed or distributed. This information can include time, date, version number, and location of installation of various files and their dependencies. These data base files can be queried for any information available therein.

Platform Independent Architecture

Embodiments of the invention are implemented in a computer programming language that can execute on more than one operating system. For example, one programming language used is Practical Extraction Report Language or "perl," which can be utilized to write software that can run on a variety of platforms such as UNIX, Apple Macintosh, and Windows operating systems. Perl is designed to handle a variety of system administrator functions. Embodiments of the invention that are written in perl, can be used without modification across a wide range of platforms. Recompilation is not required as the same executable script can be used across a wide range of platforms.

A method and apparatus for the efficient packaging and distribution of software has been described in conjunction with one or more specific embodiments. The invention is defined by the claims and their full scope of equivalents.

What is claimed is:

1. A method to package and distribute software over the Internet, said method comprising:

creating a single-file entity software package, said single-file entity software package being a single-file entity formatted to comprise multiple files, said single-file entity software package comprising a payload file and a control file, said payload file comprising one or more software files, said control file comprising control information pertaining to said software files and dependencies of said software files;

parsing said control file for said control information pertaining to said one or more software files contained in said payload file of said single-file entity software package;

installing said payload file by manipulating said one or more software files in said single-file entity software package according to said control information; and removing a software package according to said control information, wherein;

said removing said software package according to said control information comprises:

determining if there exist any pre-removal actions to be performed;

if any pre-removal actions are to be performed, performing said pre-removal actions according to said control information;

examining said control information for dependency constraints; and prohibiting removal of software files that violate said dependency constraints.

2. The method of claim 1, wherein:

said single-file entity software package includes compressed data.

3. The method of claim 1, wherein:

said single-file entity software package is retrievable from the Internet.

4. The method of claim 1, wherein:

said single-file entity software package is accessible via a URL.

5. The method of claim 1, further comprising:

upgrading said single-file entity software package by manipulating said one or more files according to said control information.

\* \* \* \* \*